F. B. COOK.
BRACKET.
APPLICATION FILED JULY 3, 1909.

962,494.

Patented June 28, 1910.

WITNESSES:
Maude J. Ball
K. D. Waldo.

INVENTOR:
FRANK B. COOK,
BY Frederick R. Parker
ATTORNEY.

UNITED STATES PATENT OFFICE.

FRANK B. COOK, OF CHICAGO, ILLINOIS.

BRACKET.

962,494.

Specification of Letters Patent.   Patented June 28, 1910.

Application filed July 3, 1909.   Serial No. 505,868.

*To all whom it may concern:*

Be it known that I, FRANK B. COOK, a citizen of the United States of America, residing at Chicago, in the county of Cook and State of Illinois, have invented a new and useful Bracket, of which the following is a specification, reference being had to the accompanying drawings, illustrating same.

My invention relates to brackets, and more in particular to formed metal brackets such as are used for supporting cable terminals or junction boxes for electrical cables.

The principal objects of my invention are, to provide an improved metal bracket of the character herein set forth; and to provide simplicity of construction and cheapness of manufacture in such a bracket.

Other objects will be apparent from the following specification.

Heretofore, brackets for cable terminals or junction boxes have been made mostly of cast metal. Such brackets are exceedingly heavy and cost considerable to make, the metal costing considerable and the labor expended on shaping and drilling the bracket necessitating considerable expense. Other formed sheet metal brackets have been made, but it has been difficult to make a rigid formed sheet metal bracket of the character adapted to be bolted to the side of a pole, cross arm, or suitable support.

The bracket herein set forth is very strong and rigid, due to the particular formation of the parts. This bracket is also very cheap to manufacture, because there is a minimum amount of metal in it and because the several holes and openings in the bracket are punched instead of being drilled as in cast metal brackets.

Figure 1:
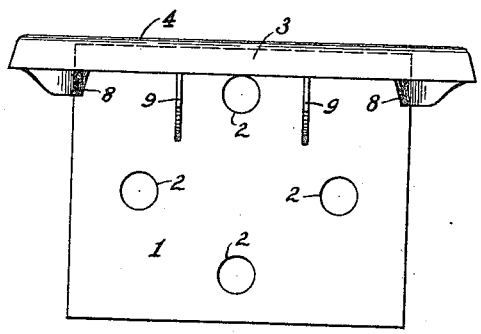
Figure 2:
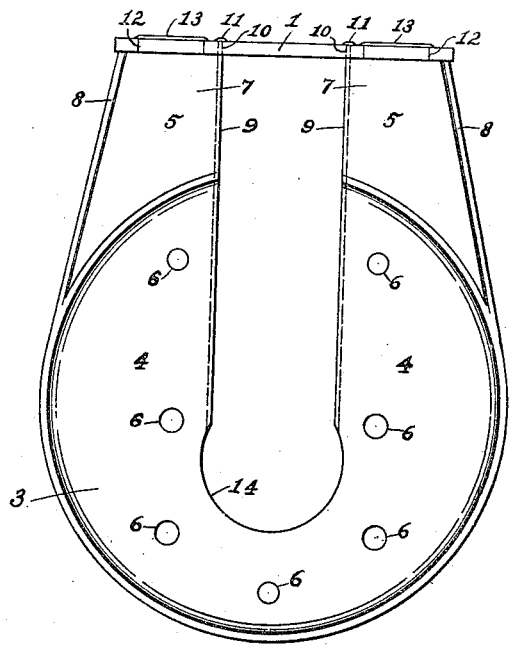
Figure 3:
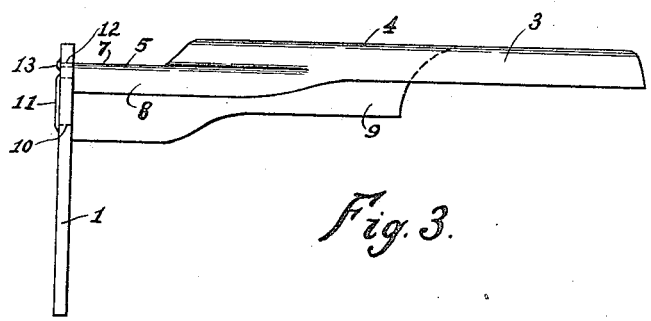

In the accompanying drawings illustrating the preferred form of my invention, Figure 1 is a front elevation of the improved bracket of the invention; Fig. 2 is a plan view of the bracket shown in Fig. 1; and Fig. 3 is a side elevation of the bracket shown in Fig. 1.

Like characters refer to like parts in the several figures.

I will now describe my invention more in detail by reference to the drawings, in which 1 is a vertical plate at the rear of the bracket, provided with holes 2 2 therein for mounting the bracket to a vertical support. The plate 1 is preferably made of a rather thick piece of sheet metal sheared to proper size and punched as shown. The horizontal support 3, for carrying a cable terminal, a junction box, or other suitable devices, is made from a piece of sheet metal preferably somewhat thinner than the plate 1, formed with a circular top portion 4 and rearwardly-extending angular portions 5 5, as shown. The circular portion 4 is provided with a number of holes 6 6 punched therein for accommodating bolts or screws for bolting a cable terminal or other suitable device to the bracket. Each of the rearwardly-extending portions 5 5 is formed with a flat horizontal portion 7, an exterior vertical portion 8 and an interior vertical portion 9, the vertical portions 9 9 being formed by splitting the portion 3 centrally from the back toward the front and turning the two edge portions of the split downwardly as shown. The rear ends of the vertical portions 9 9 extend through the plate 1 as shown at 10 10 and are riveted over as shown at 11 11 to securely attach them to the plate 1. Likewise the portions 7 7 extend through the plate 1 as shown at 12 12 and are riveted over as at 13 13 to securely attach them to the plate 1. These riveted portions 11 11 13 13 securely attach the horizontal bracket portion 3 to the vertical plate 1, the vertical formed portions 8 8 9 9 rigidly bracing the portion 3 as a whole so that it will withstand a great amount of stress thereon. The opening in the bracket formed by the portions 9 9 being turned downwardly, meets a hole 14 formed in the portion 4, so as to provide a suitable opening through the bracket to accommodate cable and aerial conductors leading from underneath the bracket up through same to a cable terminal or junction box, the portions 9 9 protecting the conductors therebetween from any sharp edges of the bracket. The portion 4 is preferably formed circularly so that a cylindrical cover for the cable terminal or junction box mounted on the bracket, may be pulled down over the portion 4 to entirely inclose the cable terminal or junction box.

It will be readily seen that the bracket of this invention comprises but two parts, both preferably of sheet metal, one being suitably and substantially attached to the other whereby great strength and rigidity is given to the whole. It will also be seen that the parts of the bracket can be very readily and cheaply made, out of a minimum amount of metal, and very readily and cheaply secured together, thus providing a very simple, substantial and durable bracket of the character specified.

Of course I do not wish to limit this invention to all of the particular details herein set forth, as various modifications of same may be made without departing from the scope of the appended claims.

What I claim as my invention is:

1. A bracket of the character described comprising a vertical metal plate, and a separate horizontal sheet metal portion having a circularly-formed supporting portion thereon, the said horizontal sheet metal portion being centrally parted and having such parted portions formed downwardly to provide rearwardly-extending angularly-formed arms with an opening therebetween, the said arms extending through the said vertical plate and being formed over to rigidly secure the parts together substantially as described.

2. A two-part bracket of the character described comprising a base member and a mounting member disposed substantially at right-angles to each other, the said base member being parted centrally and having the parted edge portions thereof formed substantially at right-angles to the remainder of the said base portion to provide a pair of angularly-formed rearwardly-extending braces, the ends of the said braces being attached to the said mounting member of the bracket, substantially as set forth.

As inventor of the foregoing I hereunto subscribe my name this 30th day of June, 1909.

FRANK B. COOK.

Witnesses:
MAUDE J. BALL,
FREDERICK R. PARKER.